United States Patent
LaBosco et al.

(10) Patent No.: US 8,837,529 B2
(45) Date of Patent: Sep. 16, 2014

(54) DIGITAL AUDIO DISTRIBUTION

(75) Inventors: Mark LaBosco, New City, NJ (US); Dario Pagano, New Providence, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 389 days.

(21) Appl. No.: 13/241,052

(22) Filed: Sep. 22, 2011

(65) Prior Publication Data

US 2012/0070004 A1    Mar. 22, 2012

Related U.S. Application Data

(60) Provisional application No. 61/385,364, filed on Sep. 22, 2010.

(51) Int. Cl.
*H04J 3/00* (2006.01)
*H04H 20/30* (2008.01)
*H04H 20/63* (2008.01)
*H04H 20/82* (2008.01)

(52) U.S. Cl.
CPC ............... *H04H 20/63* (2013.01); *H04H 20/30* (2013.01); *H04H 20/82* (2013.01)
USPC .......................................... 370/498; 370/535

(58) Field of Classification Search
CPC ....................................................... H04J 3/247
USPC ........................................ 370/252, 498, 535
See application file for complete search history.

(56) References Cited

U.S. PATENT DOCUMENTS

| | | |
|---|---|---|
| 6,266,815 B1 | 7/2001 | Shen |
| 6,973,152 B2 | 12/2005 | Gross |
| 7,200,855 B2 | 4/2007 | Laksono |
| 7,333,478 B2 | 2/2008 | Wiebe |
| 7,414,634 B2 | 8/2008 | Takemura |
| 7,443,806 B2 | 10/2008 | Ochi |
| 7,499,500 B2 | 3/2009 | Page |
| 7,555,016 B2 | 6/2009 | Page |
| 7,555,017 B2 | 6/2009 | Shay |
| 7,577,095 B2 | 8/2009 | Shay et al. |
| 7,606,174 B2 | 10/2009 | Ochi |
| 7,620,468 B2 | 11/2009 | Shimizu |
| 7,676,049 B2 | 3/2010 | Melanson |
| 7,680,135 B2 | 3/2010 | Nakayama |
| 7,684,415 B2 | 3/2010 | Nakayama |
| 7,689,305 B2 | 3/2010 | Kreifeldt |
| 7,693,083 B2 | 4/2010 | Nakayama |
| 7,702,405 B2 | 4/2010 | Hetzel |
| 7,725,826 B2 | 5/2010 | Kreifeldt |
| 7,742,606 B2 | 6/2010 | Kreifeldt |
| 7,747,725 B2 | 6/2010 | Williams |
| 7,826,580 B2 | 11/2010 | Nakayama |
| 7,912,045 B2 | 3/2011 | Page |
| 7,917,642 B2 | 3/2011 | Buckwalter |
| 7,970,019 B2 | 6/2011 | Shay |
| 7,987,224 B2 | 7/2011 | Nakayama |
| 7,990,890 B2 | 8/2011 | Ochi |

(Continued)

*Primary Examiner* — Sai-Ming Chan
(74) *Attorney, Agent, or Firm* — Crestron Electronics Inc.

(57) ABSTRACT

A master transmitter distributes a plurality of audio channels to one or more expansion receivers as a multiplexed audio stream. Control information is also transmitted between the master transmitter and the expansion receivers. Both the control information and the multiplexed audio stream are transmitted on the same cable allowing for reduced clutter and cheaper material and installation costs.

18 Claims, 17 Drawing Sheets

(56) References Cited

U.S. PATENT DOCUMENTS

| | | |
|---|---|---|
| 7,996,588 B2 | 8/2011 | Subbiah |
| 2002/0124097 A1 | 9/2002 | Isely |
| 2002/0188762 A1 | 12/2002 | Tomassetti |
| 2003/0023741 A1 | 1/2003 | Tomassetti |
| 2003/0161324 A1* | 8/2003 | Clemens et al. ......... 370/395.42 |
| 2003/0223409 A1* | 12/2003 | Wiebe ........................... 370/352 |
| 2005/0018857 A1 | 1/2005 | McCarty |
| 2007/0067552 A1 | 3/2007 | Toporski |

* cited by examiner

| # | Bit 63 | Bit 62-39 | Bit 38-36 | Bit 35-32 | Bit 31 | Bit 30-7 | Bit 6-4 | Bit 3-0 |
|---|--------|-----------|-----------|-----------|--------|----------|---------|---------|
| | | | | PS Bit stream positions | | | | |
| 1 | $id_1 39$ | $Aud_L$ | $id_1 38-36$ | 0000 | $id_0 39$ | $Aud_R$ | $Id_0 38-36$ | 0000 |
| 2 | $id_1 35$ | $Aud_L$ | $id_1 34-32$ | 0001 | $id_0 35$ | $Aud_R$ | $Id_0 34-32$ | 0001 |
| 3 | $id_1 31$ | $Aud_L$ | $id_1 30-28$ | 0010 | $id_0 31$ | $Aud_R$ | $Id_0 30-28$ | 0010 |
| 4 | $id_1 27$ | $Aud_L$ | $id_1 26-24$ | 0011 | $id_0 27$ | $Aud_R$ | $Id_0 26-24$ | 0011 |
| 5 | $id_1 23$ | $Aud_L$ | $id_1 22-20$ | 0100 | $id_0 23$ | $Aud_R$ | $Id_0 22-20$ | 0100 |
| 6 | $id_1 19$ | $Aud_L$ | $id_1 18-16$ | 0101 | $id_0 19$ | $Aud_R$ | $Id_0 18-16$ | 0101 |
| 7 | $id_1 15$ | $Aud_L$ | $id_1 14-12$ | 0110 | $id_0 15$ | $Aud_R$ | $Id_0 14-12$ | 0110 |
| 8 | $id_1 11$ | $Aud_L$ | $id_1 10-8$ | 0111 | $id_0 11$ | $Aud_R$ | $Id_0 10-8$ | 0111 |
| 9 | $id_1 7$ | $Aud_L$ | $id_1 6-4$ | 1000 | $id_0 7$ | $Aud_R$ | $Id_0 6-4$ | 1000 |
| 10 | $id_1 3$ | $Aud_L$ | $id_1 2-0$ | 1001 | $id_0 3$ | $Aud_R$ | $Id_0 2-0$ | 1001 |
| 11 | 0 | $Aud_L$ | 000 | 1010 | 0 | $Aud_R$ | 000 | 1010 |
| 12 | 0 | $Aud_L$ | 000 | 1011 | 0 | $Aud_R$ | 000 | 1011 |
| 13 | 0 | $Aud_L$ | 000 | 1100 | 0 | $Aud_R$ | 000 | 1100 |
| 14 | 0 | $Aud_L$ | 000 | 1101 | 0 | $Aud_R$ | 000 | 1101 |
| 15 | 0 | $Aud_L$ | 000 | 1110 | 0 | $Aud_R$ | 000 | 1110 |
| 16 | 0 | $Aud_L$ | 000 | 1111 | 0 | $Aud_R$ | 000 | 1111 |

FIG. 5

| 60 | Stereo Audio Source 1 | ~61 |
| --- | --- | --- |
| | Stereo Audio Source 2 | |
| | Stereo Audio Source 3 | |
| | Stereo Audio Source 4 | |
| | Stereo Audio Source 5 | |
| | Stereo Audio Source 6 | |
| | Stereo Audio Source 7 | |
| | Stereo Audio Source 8 | |
| | Stereo Audio Source 9 | |
| | Stereo Audio Source 10 | |
| | Stereo Audio Source 11 | |
| | Stereo Audio Source 12 | |
| | Stereo Audio Source 13 | |
| | Stereo Audio Source 14 | |
| | Stereo Audio Source 15 | |
| | Stereo Audio Source 16 | |
| | Stereo Audio Source 17 | |
| | Stereo Audio Source 18 | |
| | Stereo Audio Source 19 | |
| | Stereo Audio Source 20 | |
| | Stereo Audio Source 21 | |
| | Stereo Audio Source 22 | |
| | Stereo Audio Source 23 | |
| | Stereo Audio Source 24 | |
| | Stereo Audio Source 25 | |
| | Stereo Audio Source 26 | |
| | Stereo Audio Source 27 | |
| | Stereo Audio Source 28 | |
| | Stereo Audio Source 29 | |
| | Stereo Audio Source 30 | |
| | Stereo Audio Source 31 | |
| | Stereo Audio Source 32 | |

| S | SF$_{0-3}$ | Inverted SF(0-3) | Frame | S |
|---|---|---|---|---|
| S | SF4-7 | Inverted SF | Frame | S |
| S | SF(8-11) | Inverted SF | Frame | S |
| S | SF(12-15) | Inverted SF | Frame | S |
| S | SF(16-19) | Inverted SF | Frame | S |
| S | SF(20-23) | Inverted SF | Frame | S |
| S | SF(24-27) | Inverted SF | Frame | S |
| S | SF(28-31) | Inverted SF | Frame | S |
| S | SF(32-35) | Inverted SF | Frame | S |
| S | SF(36-39) | Inverted SF | Frame | S |
| S | SF(40-43) | Inverted SF | Frame | S |
| S | SF(44-47) | Inverted SF | Frame | S |
| S | SF(48-51) | Inverted SF | Frame | S |
| S | SF(52-55) | Inverted SF | Frame | S |
| S | SF(56-59) | Inverted SF | Frame | S |
| S | SF(60-63) | Inverted SF | Frame | S |

| Stereo Audio Source 1 | 61 |
| --- |
| Stereo Audio Source 2 |
| Stereo Audio Source 3 |
| Stereo Audio Source 4 |
| Stereo Audio Source 5 |
| Stereo Audio Source 6 |
| Stereo Audio Source 7 |
| Stereo Audio Source 8 |
| Stereo Audio Source 9 |
| Stereo Audio Source 10 |
| Stereo Audio Source 11 |
| Stereo Audio Source 12 |
| Stereo Audio Source 13 |
| Stereo Audio Source 14 |
| Stereo Audio Source 15 |
| Stereo Audio Source 16 |
| Stereo Audio Source 17 |
| Stereo Audio Source 18 |
| Stereo Audio Source 19 |
| Stereo Audio Source 20 |
| Stereo Audio Source 21 |
| Stereo Audio Source 22 |
| Stereo Audio Source 23 |
| Stereo Audio Source 24 |
| ⋮ |
| Stereo Audio Source 61 |
| Stereo Audio Source 62 |
| Stereo Audio Source 63 |
| Stereo Audio Source 64 |

FIG. 8

| 61 | | | | |
|---|---|---|---|---|
| S | $SF_{0-7}$ | DC | F | S |
| S | $SF_{8-15}$ | DC | F | S |
| S | $SF_{16-23}$ | DC | F | S |
| S | $SF_{24-31}$ | DC | F | S |
| S | $SF_{32-39}$ | DC | F | S |
| S | $SF_{40-47}$ | DC | F | S |
| S | $SF_{48-55}$ | DC | F | S |
| S | $SF_{56-63}$ | DC | F | S |

FIG. 9

DIGITAL AUDIO DISTRIBUTION

BACKGROUND OF THE INVENTION

1. Technical Field

The present invention relates to audio distribution systems and more specifically to digital audio distribution.

2. Background Art

No longer are listeners limited to playing the tunes on the nearest compact disc (CD) player. Residence-wide audio distribution systems allowing listeners to access remote audio sources for playback are increasingly common installations. For example, with an audio distribution system, music stored on a media server in a basement may be accessed by a listener for playback on speakers located in his bedroom.

In existing prior art audio distribution systems, it is common to put several small audio crosspoints/preamplifiers and amplifiers in a central location and run speaker wire throughout the residence to distribute audio. Such prior art systems use looping cables to connect a single source to multiple crosspoint/preamplifiers. However, those skilled in the art will recognize that this results in unnecessary clutter in the system rack and increased installation and material cost.

In addition, prior art audio systems required speaker cables to be home run from a central audio location to distributed speakers. Long speaker cable runs often require the use of heavy gauge speaker wire which is not only costly but also difficult to distribute throughout a house. Heavy gauge cables, often bundled together, may not fit in conduit, thereby requiring an installer to cut through residential walls.

Long analog audio signal paths may also decrease audio performance and increase ground noise issues between boxes. As the length of the cable run increases, analog signal strength and clarity may decrease.

Additionally, in certain audio distribution systems, particularly those employing RCA audio cables, speakers may be damaged if a cable is inserted or removed while an amplifier is active. For example, insertion or removal of an RCA cable may cause "pops" or audio transients to be generated.

There is a desire to distribute audio to remote speakers at decreased cost, complexity and damage to the system. Accordingly, there is a need for improved audio distribution systems, devices and methods for cheaply and easily distributing audio. There is also a need for such a system to offer improved protection for connected speakers.

SUMMARY OF THE INVENTION

It is to be understood that both the general and detailed descriptions that follow are exemplary and explanatory only and are not restrictive of the invention.

DISCLOSURE OF INVENTION

Principles of the invention provide systems and devices for distributing digital audio. For example, according to a first aspect, the present invention provides a system for distributing audio comprising a master transmitter and an expansion receiver. The master transmitter is configured for multiplexing a plurality of audio channels as a time division multiplexed (TDM) audio stream, transmitting the TDM audio stream on a first communication path, and transmitting control information on a second communication path. The expansion receiver is configured for receiving the TDM audio stream and control information, demultiplexing the TDM audio stream and distributing a desired audio channel to a speaker according to the control information.

A second aspect of the invention provides a device configured for transmitting a plurality of audio channels as a TDM audio stream. The device comprises an analog audio input path and a digital audio input path. The analog audio input path comprises an analog to digital converter configured for receiving two analog audio signals and outputting a digital audio stream in I2S format at twenty four bits precision. The digital audio input path comprises a sample rate converter configured for receiving two channels of audio and outputting a digital audio stream in I2S format at twenty-four bits precision synchronized and phase locked with the analog audio input path. The device further comprises an address module configured for inserting a first address and a second address into unused portions of each I2S stream, a multiplexer module configured for multiplexing the I2S streams as a time division multiplexed signal with an embedded clock, and a physical layer interface configured for transmitting the multiplexed audio stream on a first communication path and control information on a second communication path.

A third aspect of the invention provides a device for receiving a TDM audio stream and distributing demultiplexed audio signals to one or more speakers. The device comprises a physical layer interface configured for receiving the TDM audio stream on a first communication path and control information on a second information path, a demultiplexer module for demultiplexing the multiplexed audio stream into a plurality of I2S streams, each I2S stream comprising two audio channels, a crosspoint configured for routing a desired I2S stream to an output path according to the control information, and the output path configured for transmitting the I2S stream to a speaker. The output path further comprises a digital signal processor, a digital to analog converter and an audio power amplifier.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWING

Figure 1:
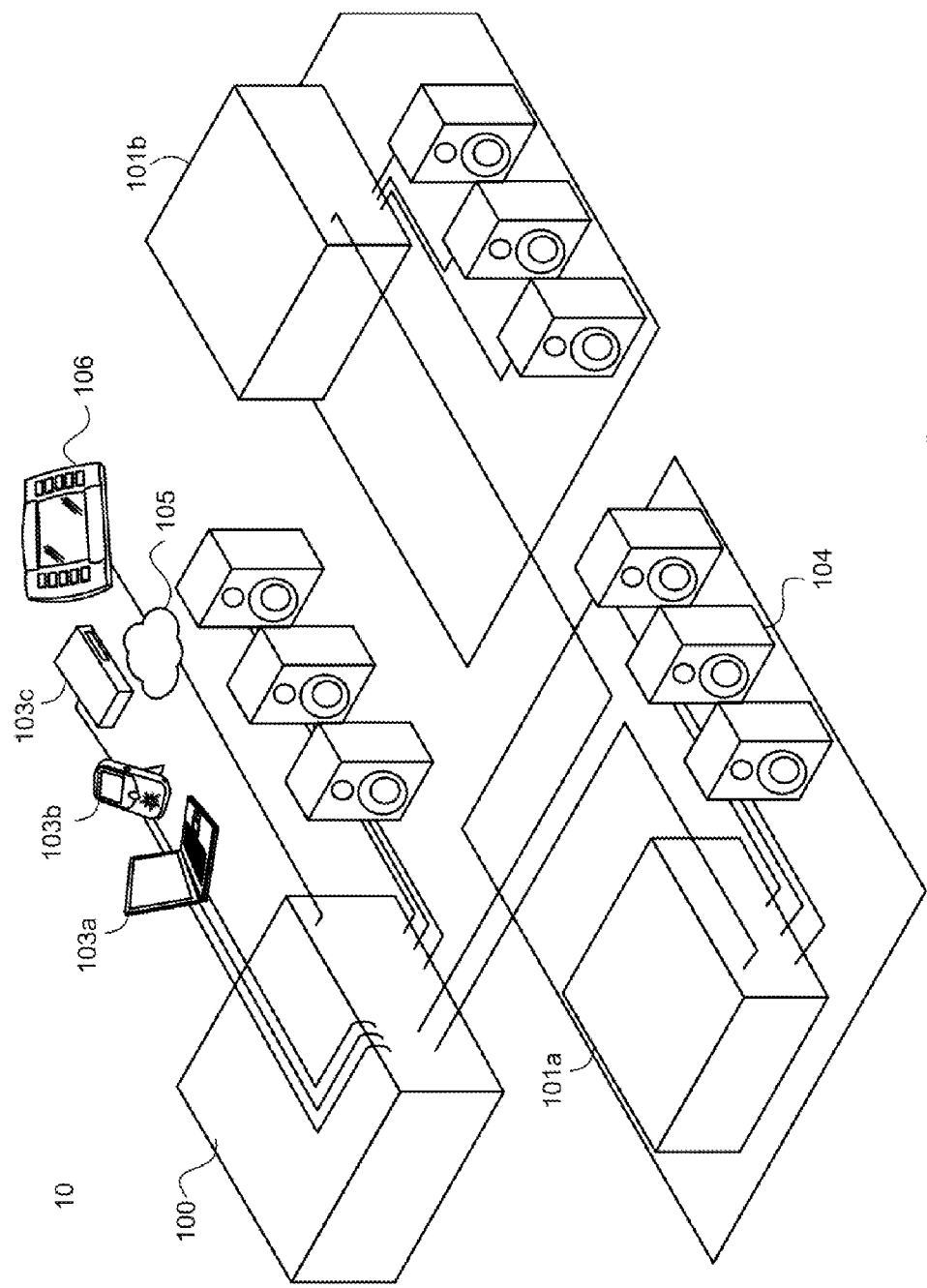

FIG. 1 is a diagram of a system for distributing audio according to an illustrative embodiment of the invention.

Figure 2:
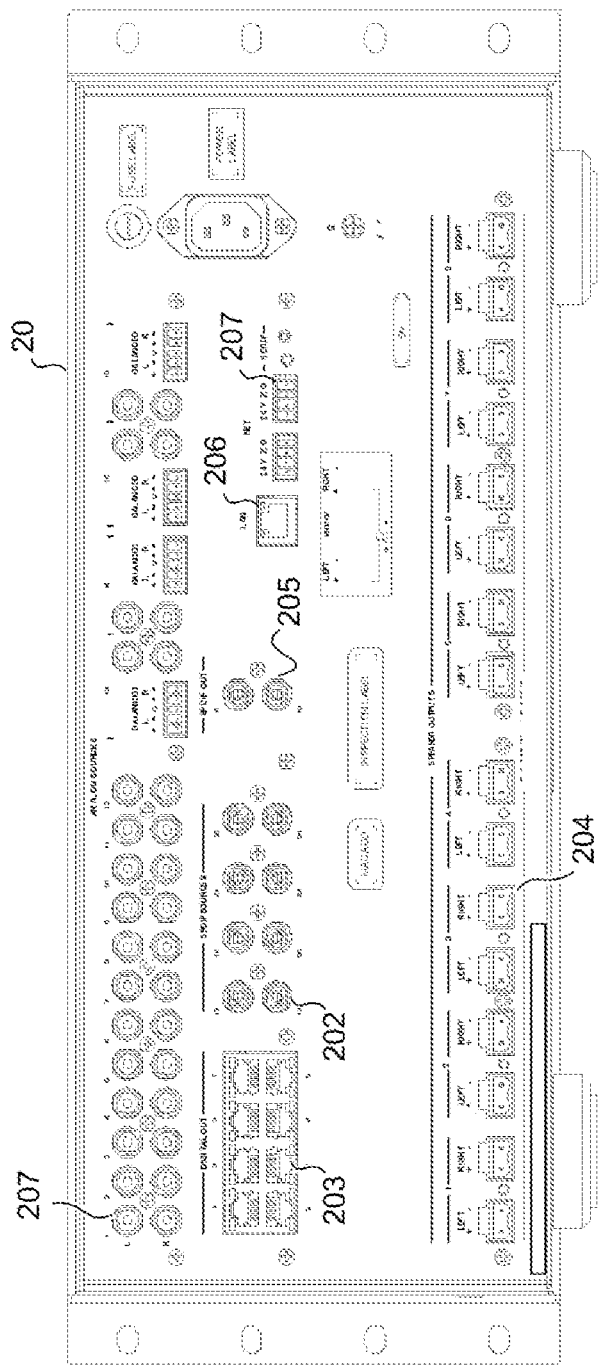

FIG. 2 shows the front of a master transmitter device suitable for use in the audio distribution system of FIG. 1, according to an illustrative embodiment of the invention.

Figure 3:
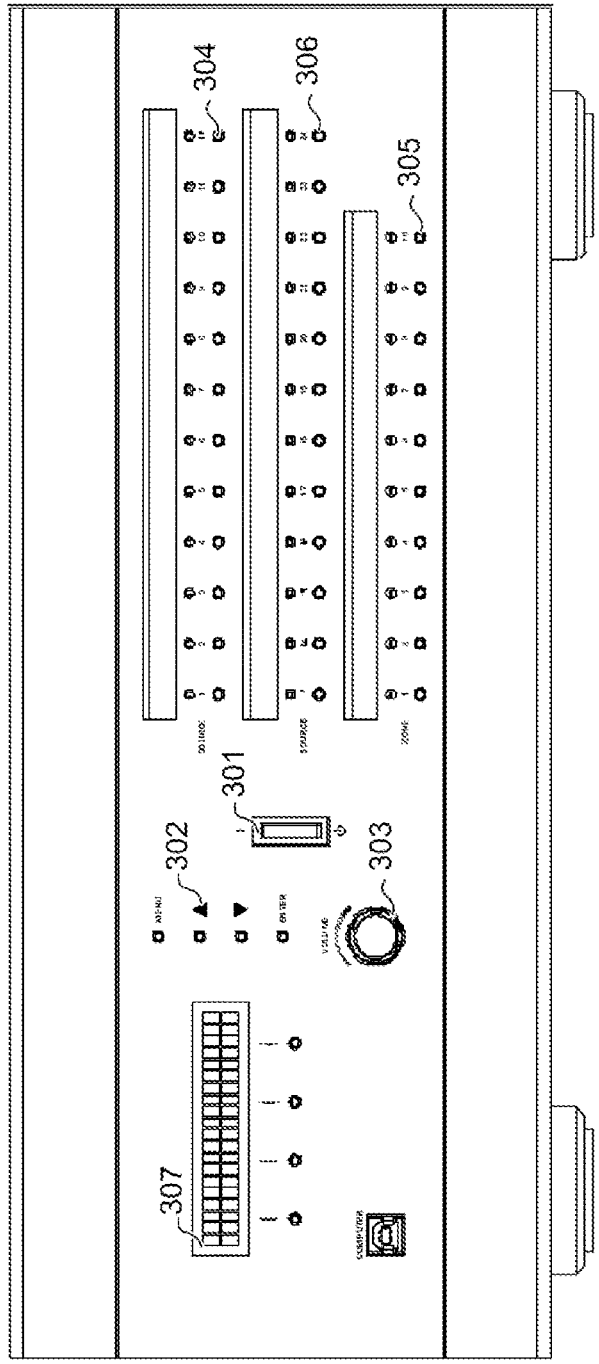

FIG. 3 shows the back of the master transmitter device according to an illustrative embodiment of the invention.

Figure 4:
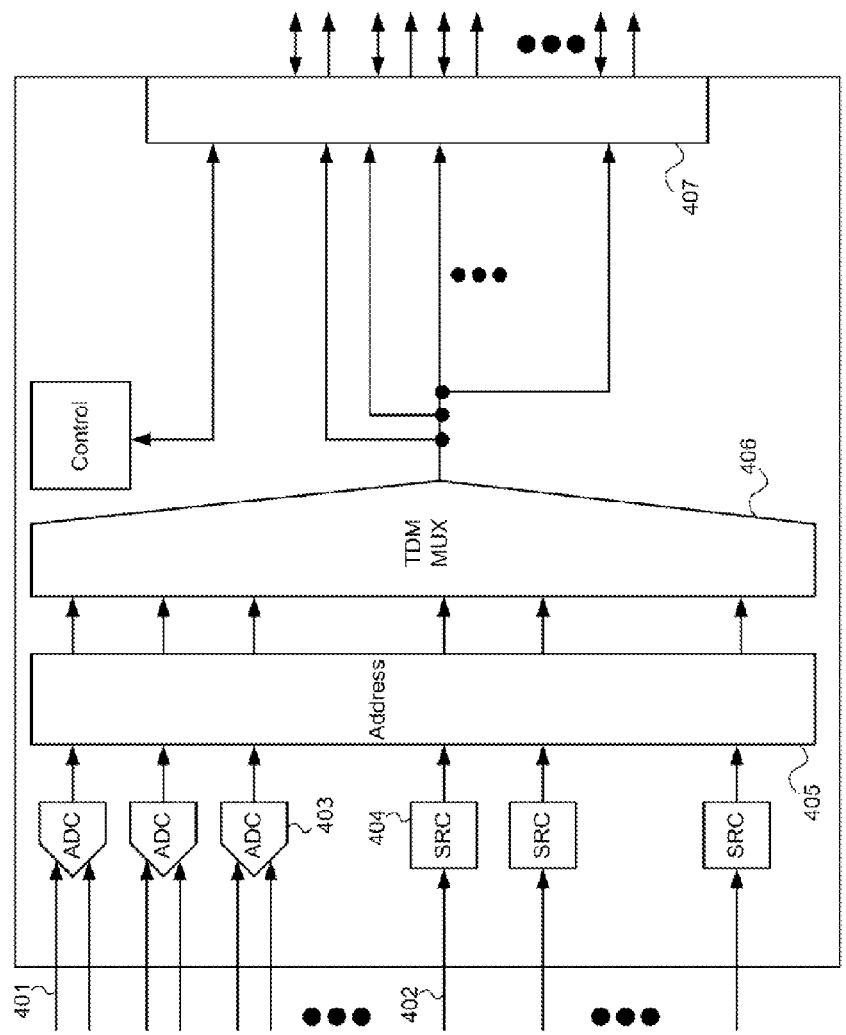

FIG. 4 is a block diagram of the master transmitter device according to an illustrative embodiment of the invention.

FIG. 5 is a chart showing bit positions of a multi-frame addressing scheme, according to an illustrative embodiment of the invention.

FIG. 6 is an illustrative diagram showing a frame of a multiplexed audio stream, according to an illustrative embodiment of the invention.

FIG. 7 is an illustrative diagram showing a time slot of the multiplexed audio stream of FIG. 6, according to an illustrative embodiment of the invention.

FIG. 8 is an illustrative diagram showing a frame of a multiplexed audio stream, according to an illustrative embodiment of the invention.

FIG. 9 is an illustrative diagram showing a time slot of the multiplexed audio stream of FIG. 8, according to an illustrative embodiment of the invention.

Figure 10:
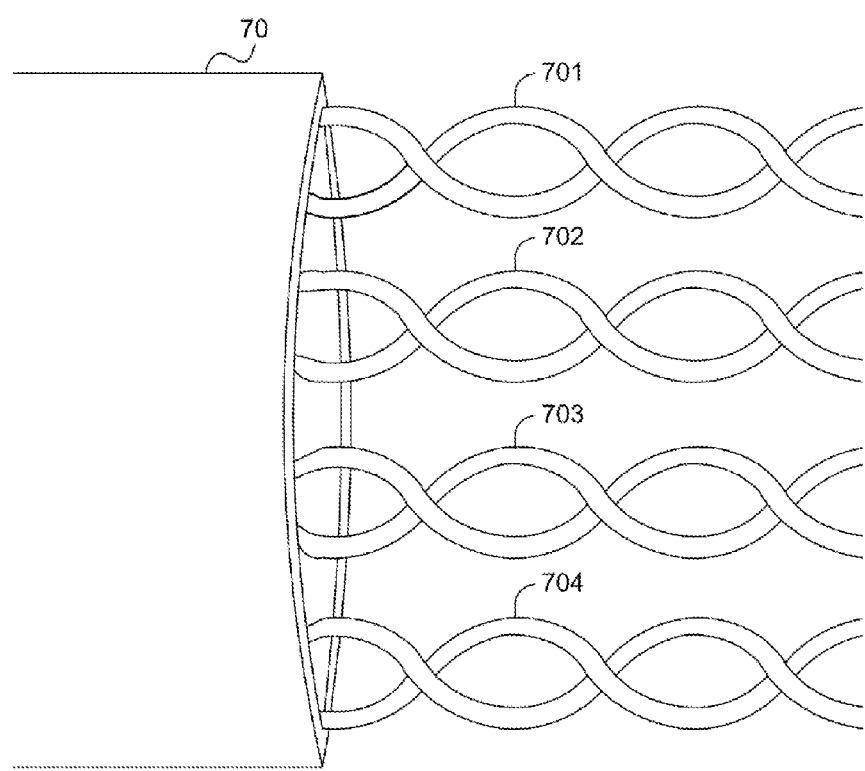

FIG. 10 shows a cross section of a category-5 cable, according to an illustrative embodiment of the invention.

Figure 11:
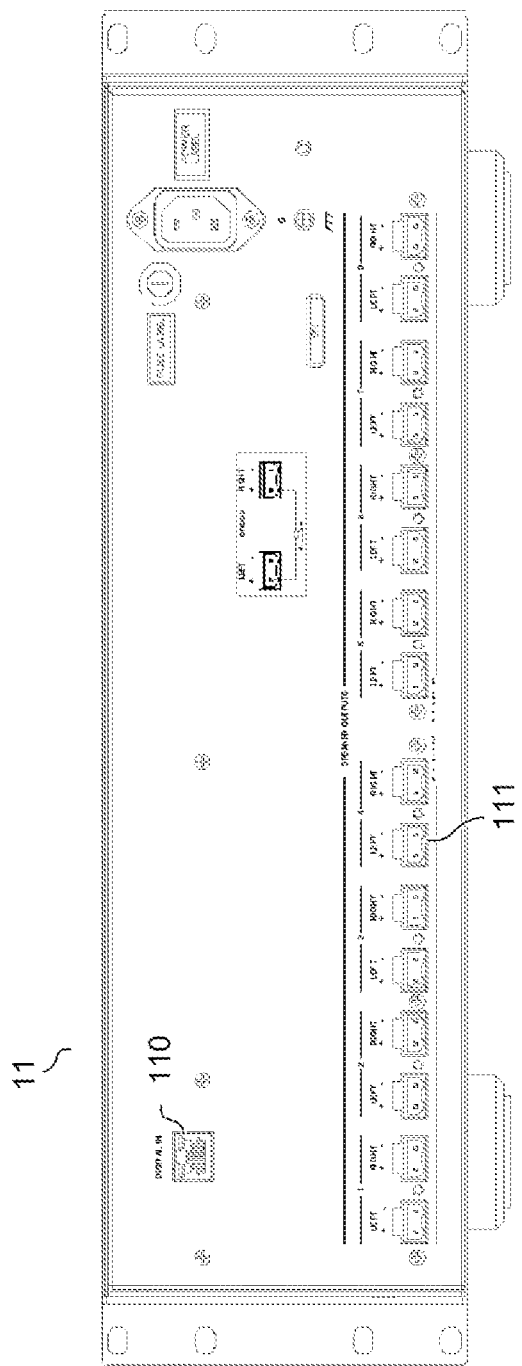

FIG. 11 shows the front panel of an expansion receiver, according to an illustrative embodiment of the invention.

Figure 12:
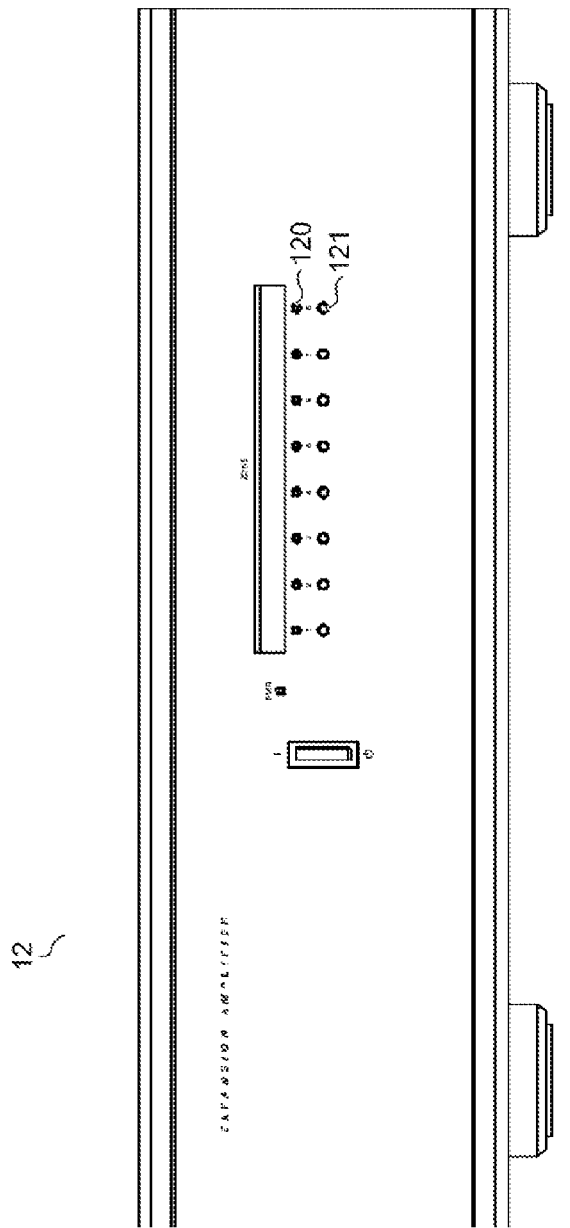

FIG. 12 shows the back panel of an expansion receiver, according to an illustrative embodiment of the invention.

Figure 13:
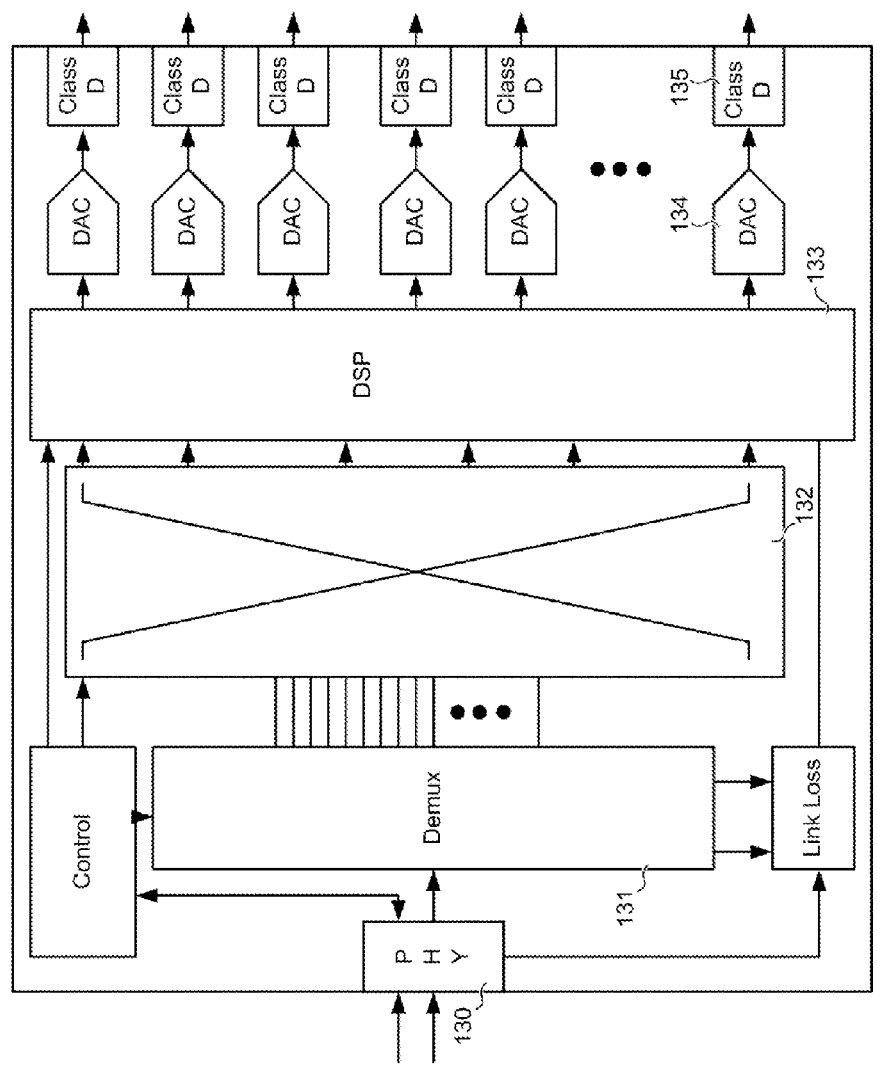

FIG. 13 is a block diagram of the expansion receiver, according to an illustrative embodiment of the invention.

Figure 14:
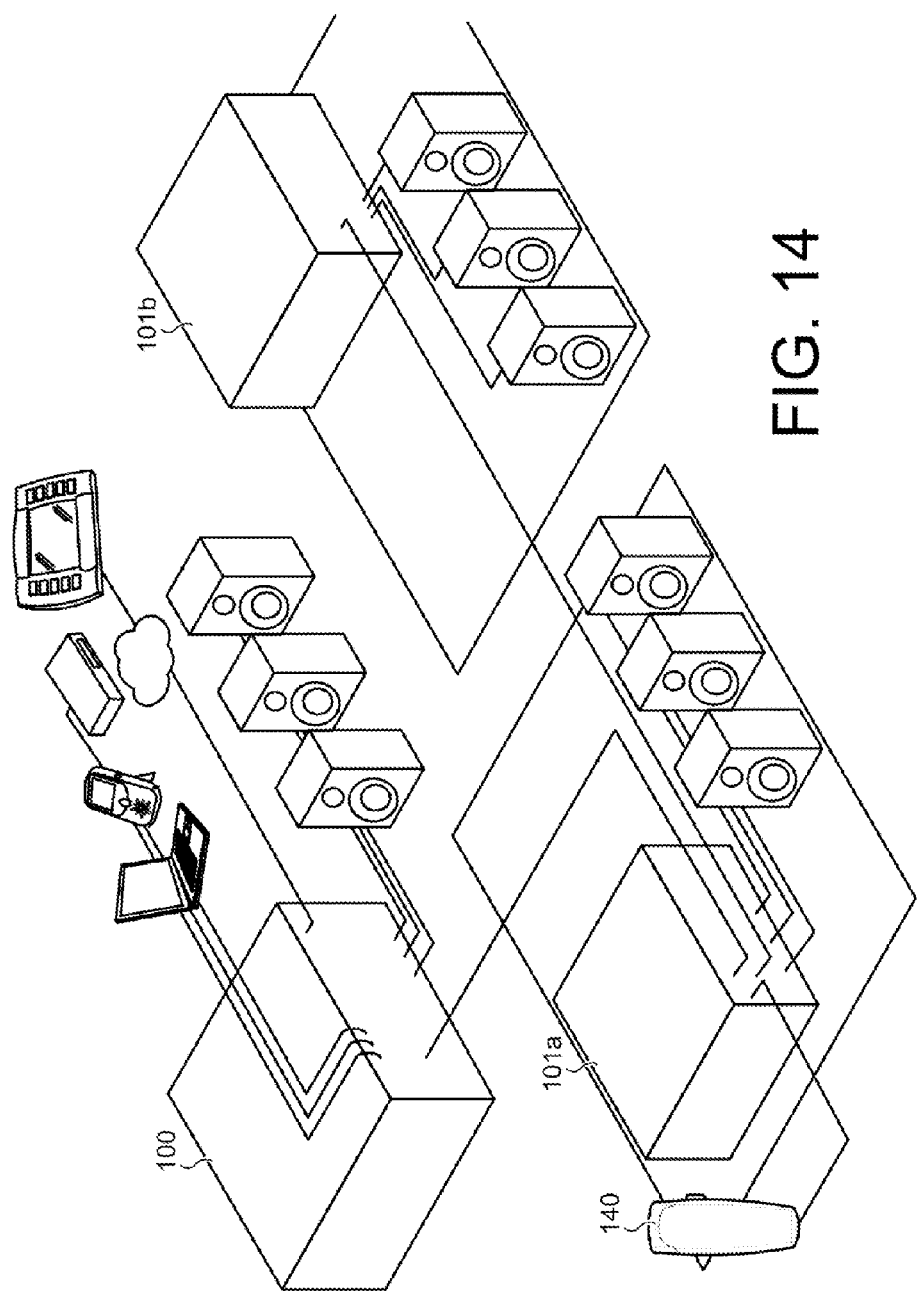

FIG. 14 is a diagram of a system for distributing audio with daisy-chained expansion receivers, according to an illustrative embodiment of the invention.

Figure 15:
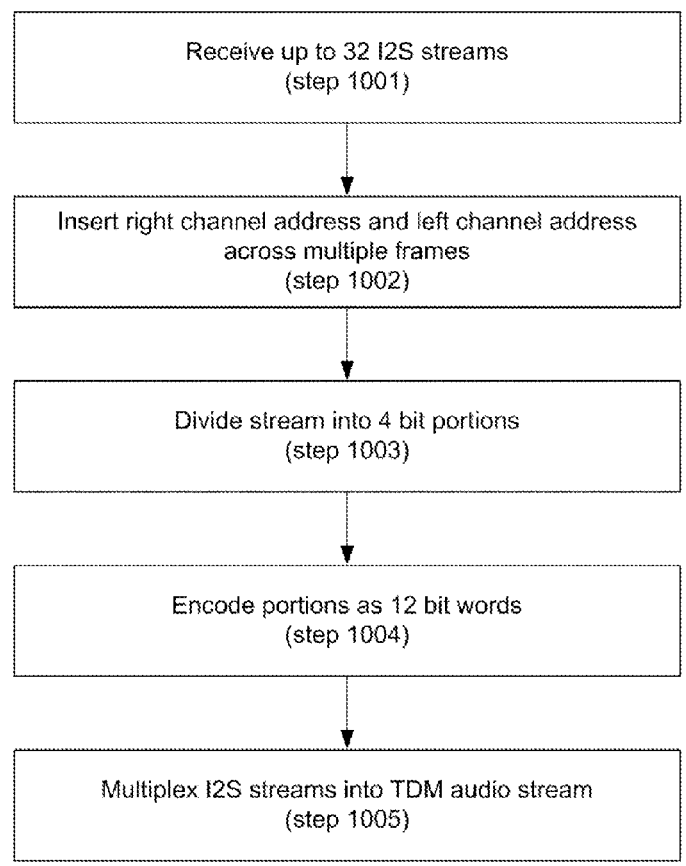

FIG. 15 is a flowchart illustrating a method for distributing audio according to an illustrative embodiment of the invention.

Figure 16:
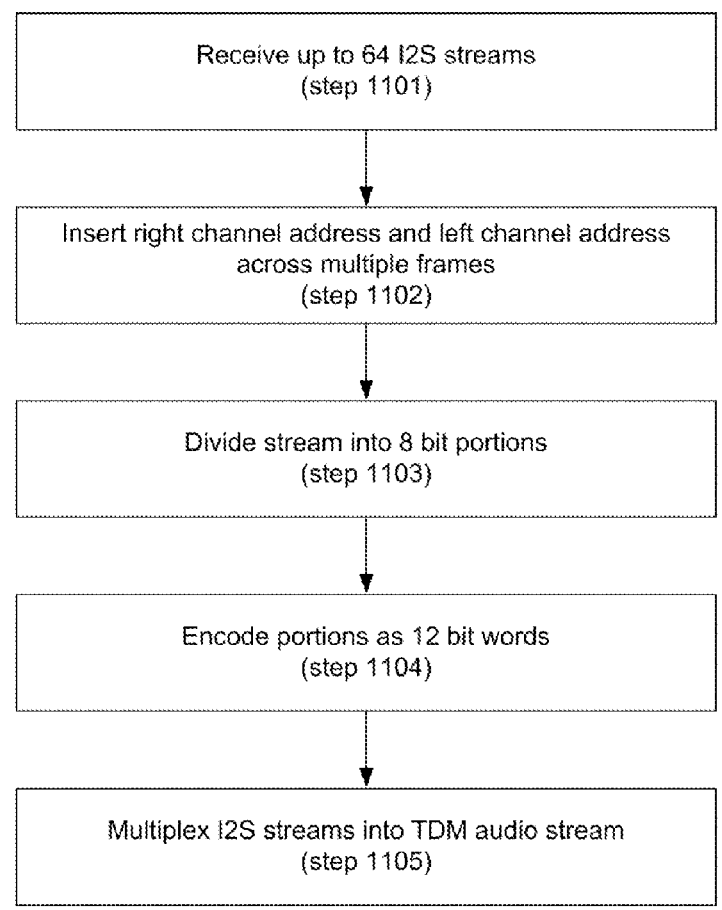

FIG. 16 is a flowchart illustrating a method for distributing audio according to an illustrative embodiment of the invention.

Figure 17:
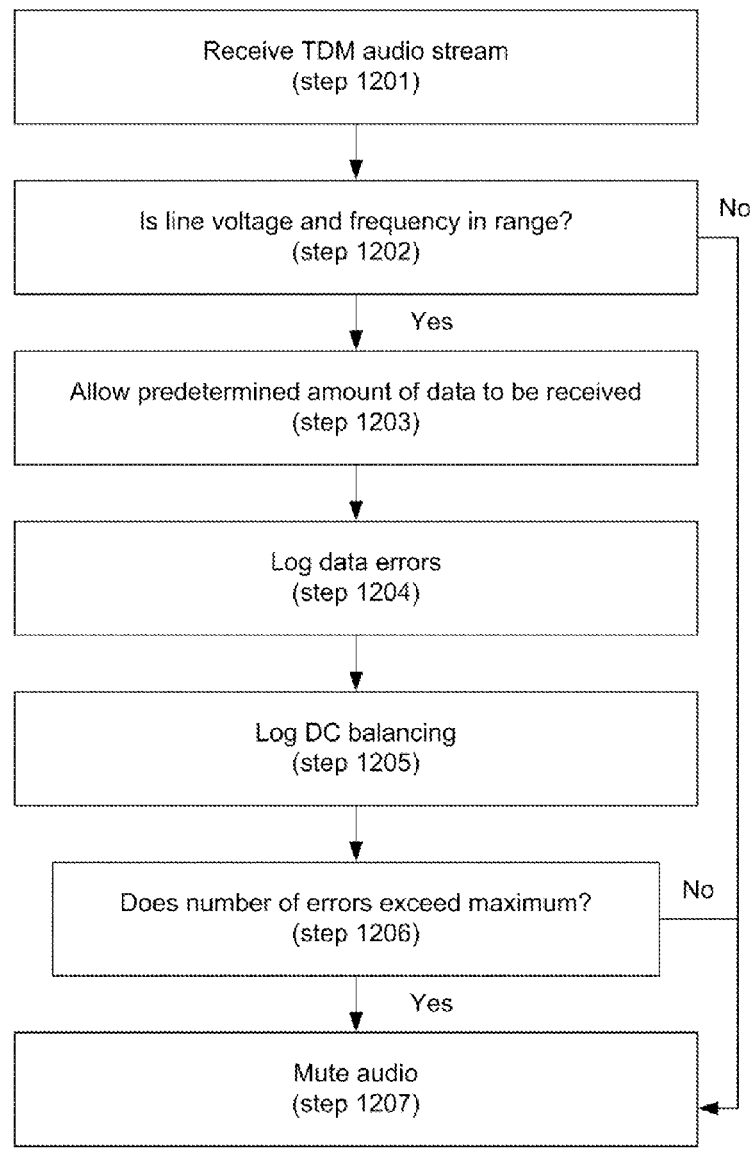

FIG. 17 is a flowchart illustrating a method of processing a time division multiplexed audio stream according to an illustrative embodiment of the invention.

LIST OF REFERENCE NUMBERS FOR THE MAJOR ELEMENTS IN THE DRAWING

The following is a list of the major elements in the drawings in numerical order.
10 audio distribution system
11 back panel
12 front panel
20 back panel
30 front panel
60 frame
61 slot
70 cat-5 cable
100 master transmitter
101*a* first expansion receiver
101*b* second expansion receiver
103*a-c* audio sources
104 speaker
105 network
106 touchpanel
110 digital communication port
111 speaker output
120 zone button
121 status light
130 physical layer interface
131 demultiplexer
132 crosspoint
133 digital signal processor
134 digital to analog converter
135 audio power amplifier
140 local audio source
201 analog input port
202 digital input port
203 digital communication port
204 speaker output
205 digital output
206 RJ-45 port
207 terminal block
301 power button
302 menu control buttons
303 volume control
304 source button
305 destination button
306 indicator light
307 display
401 analog input path
402 digital input path
403 analog to digital converter
404 sample rate converter
405 address module
406 TDM module
407 physical layer interface
701 first pair
702 second pair
703 third pair
704 fourth pair

DETAILED DESCRIPTION OF THE INVENTION

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

Mode(s) for Carrying Out the Invention

The present invention provides systems, devices and methods for distributing audio. Specifically, the present invention allows a plurality of audio sources to be distributed by a master transmitter to a plurality of expansion receivers as a multiplexed audio stream. A separate control bus from the master transmitter to the expansion receivers allows the master transmitter to control the expansion receivers. The multiplexed audio stream and controls may be transmitted on a single cable thereby reducing clutter, cable costs and installation costs.

FIG. 1 shows an audio distribution system, according to an illustrative embodiment of the invention. The inventive audio distribution system 10 comprises a master transmitter 100 coupled to a first expansion receiver 101*a* and a second expansion receiver 101*b*. The master transmitter 100 is collocated with one or more audio sources 103*a-c* in a central location. The expansion receivers 101 are distributed nearer to clusters of speakers 104 organized as zones. For example, the master transmitter 100 may be located in an equipment rack in a basement of a residence and expansion receivers 101 may be distributed throughout the residence, such as on each floor or in adjacent facilities such as a guest house or an outdoor patio.

Each expansion receiver 101 is coupled to one or more speakers 104 as zones. A zone may comprise one speaker or a group of speakers 104. An expansion receiver 101 located on a first floor of a residence may distribute audio from one audio source 103 to a speaker located in a first zone, such as a kitchen, and audio from a different audio source 103 to a speaker located in a second zone such as a living room.

Advantageously, distributing the expansion receivers 101 near speaker clusters, allows for significant shortening of speaker cable lengths. Shorter speaker cable distances minimize analog signal losses. Additionally, smaller distances between expansion receiver and speaker allows for lighter gauge speaker cable to be employed which can save significant labor and material costs.

The master transmitter 100 is configured for receiving audio from a plurality of audio sources 103, both digital and analog. An audio source 103 may be any device capable of transmitting audio signals, such as a CD player, a media server, an mp3 player, a satellite receiver, a personal computer, a microphone, a musical instrument or a radio tuner. For example, the master transmitter 100 may receive audio from a CEN-TRACK radio tuner or CEN-IDOCV mp3 interface, both available from Crestron Electronics, Inc. of Rockleigh, N.J.

The master transmitter 100 is further configured to multiplex all received audio signals, regardless of source or destination, into a single multiplexed audio stream using time division multiplexing (TDM). The master transmitter 100 transmits the multiplexed audio stream to each expansion receiver 101. The expansion receivers 101 receive the multiplexed audio stream and recover the audio from the multiplexed audio stream for one or more desired audio sources 103. The recovered audio from each desired audio source 103 is processed, amplified and transmitted to one or more zones of speakers 104 for playback.

The master transmitter 100 communicates with each expansion receiver 101 via two or more communication paths. A first communication path serves as an audio bus and a second path serves as a control bus. For example, the two communication paths may be two twisted pairs, shielded or unshielded, of a category-5 (Cat-5) cable. A first twisted pair serves as an audio bus for the multiplexed audio stream. A second twisted pair serves as a bi-directional control bus.

The master transmitter 100 transmits control information via the control bus to the expansion receiver 101. Control information may comprise zone grouping, source selection, volume level, tone control, equalization and other audio processing parameters. In addition to control information, status information may be transmitted from the expansion receiver 101 to the master transmitter 100 on the control bus. For example, the expansion receiver 101 may transmit amplifier faults back to the master transmitter 100.

Control information may be input to the master transmitter 100 locally through a user interface on the master transmitter 100 or remotely through a control network 105. For example, a user may enter commands on a graphical user interface displayed on a networked touchpanel 106 to select an audio source 103 for playback in a zone, control the playback volume, as well as other playback and processing parameters. Advantageously, the expansion receiver 101 need not be connected to the control network 105 allowing for plug and play connectivity with the master transmitter 100.

FIG. 2 shows the back panel 20 of the master transmitter 100 and FIG. 3 shows the front panel of the master transmitter 100, according to an illustrative embodiment of the invention. The back panel 20 comprises a plurality of analog input ports 201, a plurality of digital input ports 202, a plurality of digital communication ports 203, and a plurality of network interface ports. In addition, the back panel 20 comprises a plurality of output ports, both analog and digital, for distributing audio directly to local zones.

The master transmitter 100 is configured to receive analog audio signals from a plurality of analog stereo sources via the analog input ports 201. For example, the analog input ports 201 may be RCA jack configured for receiving RCA cables. The master transmitter 100 is also configured to receive audio from a plurality of digital stereo sources via the digital input ports 202. For example, the digital input ports 202 may be Sony/Philips Digital Interconnect Format (S/PDIF) ports.

According to the embodiment shown in FIG. 3, the master transmitter 100 is capable of receiving forty-eight (48) channels of audio from sixteen (16) analog stereo sources and eight (8) digital stereo sources. However, the master transmitter 100 is not limited to forty-eight (48) channels or to stereo sources. As described later in the specification, the master transmitter 100 is configured for multiplexing up to sixty-four (64) channels of audio from any combination of digital and audio sources 103. In still another embodiment of the invention, the master transmitter 100 is configured for multiplexing up to one hundred twenty eight (128) channels of audio.

Additionally, throughout this description, the received audio is described as being stereo audio and the master transmitter 100 is described as being configured to receive stereo audio sources 103. However, the master transmitter 100 is not limited to stereo audio sources 103. The sixty-four (64) audio channels may come from any type of audio source 103 including mono sources and surround sound sources.

In an embodiment of the invention, the master transmitter 100 comprises a surround sound decoder for decoding surround sound signals into individual channels. For example Dolby Digital or DTS signals could be input via a SPDIF port, Toshiba Link (TOSLINK) port or High-Definition Multimedia Interface (HDMI) port. These streams could be decoded into channels multiplexed and distributed the expansion receivers 101.

The back panel 20 of the master transmitter 100 comprises a plurality of digital communication ports 203, each configured for communicating with an expansion receiver 101. For example, the digital communication ports 203 may be RJ-45 female ports configured for receiving CAT-5 cable. The RJ-45 female ports may further comprise status LEDs to indicate link activity. The master transmitter 100 is configured to transmit eight (8) multiplexed audio streams to expansion receivers 101, according to the embodiment shown in FIG. 3. However, in other embodiments, the master transmitter 100 may communicate with any number of expansion receivers 101.

The back panel 20 of the master transmitter 100 further comprises eight (8) speaker outputs 204 for transmitting analog audio signals to one or more zones of speakers 104 and two (2) digital outputs 205, such as S/PDIF output ports for transmitting digital audio to a digital receiver. To provide more power output, the speakers 104 may be bridged. For example, to overcome a noisy environment like an outdoor patio, a first speaker output and a second speaker output may be bridged to provide additional power.

The back panel 20 of the master transmitter 100 further comprises two network interface for communicating on a network. For example, in the embodiment shown in FIGS. 2 and 3, the back panel 20 of the master transmitter 100 comprises both an RJ-45 port 206 and a pair of four (4) pin detachable terminal blocks 207 for communicating with a network. For example, the four (4) pin detachable terminal blocks 207 may be employed for communicating on a Cresnet control network available from Crestron Electronics, Inc. of Rockleigh, N.J. In a further embodiment of the invention, the master transmitter 100 further comprises an internet connection for receiving internet radio.

The front panel of the inventive master transmitter 100 comprises a power button 301, menu control buttons 302, volume control 303, source buttons 304, destination buttons 305, indicator lights 306 and a display 307.

The display, such as a liquid crystal display (LCD) display, is configured to display menu, source and zone selection information, amplifier and expansion receiver status, network and control configuration volume levels and other parameters.

The master transmitter 100 is configured to allow a user to set parameters for the master transmitter 100, audio sources 103, and zones by navigating a series of menus on the display with the menu control buttons 302. For example, a user may set the compensation level for each audio source 103 via the menu control buttons 302. For each zone, a user may set parameters such as EQ, bass, treble, loudness, balance, channel type (i.e. mono or stereo), minimum volume, maximum volume, start-up volume, bussing, bus volume offset, bussing lists, bridging, wattage, impedance level, speaker protect enable and dynamic range control. The master transmitter 100 is further configured to allow a user to set control system settings via the display and menu control buttons 302.

Additionally, expansion receiver status and master transmitter 100 amplifier status may be accessed and displayed with the menu control buttons 302 and display. Faults communicated to the master transmitter 100 device from the expansion receiver 101 over the control bus may be displayed on the display.

FIG. 4 is a block diagram of the inventive master transmitter 100 device, according to an illustrative embodiment of the invention. The master transmitter 100 comprises a plurality of analog input paths 401 and a plurality of digital input paths 402. The transmitter device further comprises an address module 405, a TDM module 406 and a physical layer interface.

The input paths are configured to supply a plurality of phase locked and synchronized digital audio streams to the address module 405. The number of input paths is determined by the number of audio channels supported by the master transmitter 100. In embodiments of the invention, the number of audio channels is sixty-four and in other embodiments the number of audio channels supported is one hundred twenty-eight. In the embodiment shown in FIG. 4, there are thirty-two input paths supplying sixty-four channels of audio.

Each analog input path 401 is configured for receiving a right channel and a left channel of audio from an analog audio source 103. Each analog audio input has an associated analog to digital converter 403 (ADC) configured for sampling each channel of audio at a sample rate of fourty-eight (48) kilohertz (kHz) and at a bit depth of twenty-four (24) bits. This depth and sample rate provides a frequency response up to 24 kHz and a dynamic range of one-hundred fourty-four (144) decibels (dB). The ADC 403 is further configured to output the two channels of audio as a single digital data stream of sixty-four bits per sample frame (i.e. 32 per channel) in Integrated Interchip Sound (I2S) standard format. Each I2S stream has a bit clock of 3.072 megahertz (MHz) and a sample clock of forty-eight (48) kHz and is phase locked and synchronized.

Each digital input path is configured for receiving a digital audio stream comprising a right channel of audio and a left channel of audio from a digital audio source 103. Each digital input path has an associated sample rate converter 404 configured for converting and synchronizing the digital audio stream to the same format and phase as the converted analog audio channels. Each digital input path supplies a digital audio stream to the address module 405 at forty-eight (48) kHz sampling rate and twenty-four (24) bit precision in I2S format.

The address module 405 receives the plurality of synchronized audio streams from the analog and digital input paths and inserts a portion of an address into the unused portion of each I2S sample frame. The address is a five (5) byte address that is composed of a transmitter ID and an channel ID. The transmitter ID is a two (2) byte ID that identifies the master transmitter 100 device. The transmitter ID is constant for all audio sources 103 received at the transmitter and may be utilized in embodiments where multiple master transmitter 100s are connected to a switch. The channel ID is a three (3) byte ID that uniquely tags each channel of audio received. This allows for identification of the audio source 103 and channel and may also be used by the receiver module to recall presets associated with the audio source 103.

Transmitter ID and channel ID are concatenated together to form a five (5) byte long address unique to each channel of audio. To accommodate the limited free bits available in each I2S sample frame, a multiframe addressing scheme is employed by the addressing module to distribute the five (5) byte address among multiple sample frames.

FIG. 5 is a table illustrating bit stream positions in the multiframe addressing scheme, according to an illustrative embodiment of the invention. The table in FIG. 5 shows the bit positions for sixteen (16) sample frames of a first audio source 103. The five byte address for the right channel is represented as $ID_0 0$-$ID_0 39$ and the address for the left channel is represented as $ID_1 0$-$ID_1 39$. Each five (5) byte address is inserted in ordered portions throughout sixteen (16) successive sample frames of the first audio source 103. The multiframe scheme repeats after each sixteen (16) successive sample frames such that the full five (5) byte address is inserted every sixteen (16) frames.

For each sample frame, the first four (4) bits comprise a multiframe position. The multiframe position indicates which frame of the sixteen (16) samples follows. The next three bits comprise a portion of the address for the right channel of audio. The following bits comprise the twenty-four (24) sample of audio for the right channel. Another bit representing the address of the right channel of audio follows the audio data. The following three bits repeat the multiframe sequence. The next four (4) bits comprise a portion of the address for the left channel of audio. The following bits comprise the twenty-four (24) sample of audio for the left channel. The final bit is a portion of the address for the left channel of audio.

Only ten (10) sample frames are required for distributing the address. The address time slots in the remaining six (6) frames may comprise zeros, as seen in FIG. 5, or may be used to encode other data, such as source location, audio meta data or volume compensation parameters.

In an embodiment of the invention, meta-data is appended to the audio streams. For example, meta-data may include song titles, artist, radio station ID, album cover artwork, and lyrics. Advantageously, meta-data extracted from an audio channel can be displayed on a video monitor or a two-way communicating remote control with a display.

The address module 405 outputs each audio stream with the five (5) byte address distributed across each sixteen (16) successive sample frames. The TDM module 406 is configured for receiving each serial audio stream from the address module 405 and multiplexing them into a single audio stream using TDM. The multiplexed audio stream output by the TDM module 406 is both DC balanced and self-clocking. Each frame of the multiplexed audio stream is divided into time slots 61 with each time slot comprising a sample of audio from a stereo audio source 103.

Additionally, for every successive sixteen sample frames of an audio source 103, the TDM module 406 is further configured for inserting a three bit port ID into an unused portion of a sample frame. The port ID identifies to which of the output ports an expansion receiver 101 is connected. Advantageously, this provides plug and play capability with the expansion receiver 101.

FIG. 6 shows a frame of the multiplexed audio stream, according to an illustrative embodiment of the invention. Each frame 60 of the multiplexed audio stream comprises thirty-two (32) time slots 61. Each time slot 61 of the frame 60 comprises a sample of audio from both channels of a corresponding stereo source.

FIG. 7 is an illustrative diagram of a time slot 61 of the multiplexed audio stream, according to an illustrative embodiment of the invention. Each sixty-four (64) bit sample frame is divided into four bit portions and each of these four bit portions are then encoded as twelve bit words 71. Each frame 60 comprises five hundred twelve (512) DC balanced words 71. The first bit of each word 71 is a start bit. The following four (4) bits comprise the four bit portion of the sixty-four (64) bit sample frame. The following four (4) bits are an inverted copy of the preceding four bits. The inverted bits are used for direct current (DC) balancing and error detection. The next two (2) bits are framing bits and allow recovery of the channel clock at the expansion receivers 101. The two bits may be either 01 or 10 to maintain DC balancing. The twelfth bit is a stop bit.

Where the number of audio sources connected or supported is less than 32, the payload is padded with zeroes. For example, in the embodiment shown in FIG. 4, the master transmitter 100 is configured to receive fourty-eight channels of audio from twenty-four stereo sources. However, the TDM module 406 is still configured to divide the multiplexed audio stream into thirty-two time slots 61 with the unused time slots 61 being padded with zeroes. Advantageously, this allows for the data rate of the transmitted multiplexed audio stream to remain constant, which simplifiers expansion receiver design.

FIG. 8 is an illustrative diagram of a multiplexed frame, according to this illustrative embodiment. In another embodiment of the invention, the master transmitter 100 is configured to receive 128 channels of audio (i.e. 64 audio sources). Each frame 60 of the multiplexed audio stream comprises sixty-four (64) time slots 61. Each time slot 61 of the frame 60 comprises a sample of audio from both channels of a corresponding stereo source.

FIG. 9 is an illustrative diagram of a time slot of the multiplexed audio stream, according to an illustrative embodiment of the invention. To accommodate the 128 audio channels, each twelve bit word 71 comprises an eight bit portion of the sample frame. The sixty-four (64) bit sample frame is divided into eight bit portions and each of these eight bit portions is then encoded as twelve bit words 71. Each frame 60 comprises five hundred and twelve (512) words 71. The first bit of each word 71 is a start bit. The following four (8) bits comprise the four bit portion of the sixty-four (64) bit sample frame. The next bit is employed to DC balance the word. The following bit is a framing bit allowing the expansion receiver 101 to recover the channel clock. The twelfth bit is a stop bit.

Unlike the embodiment with sixty-four channels, each word 71 is not DC balanced. The master transmitter 100 maintains a running count of the number of zeros and ones in the multiplexed audio stream. If the number of zeroes exceeds the number of ones, words 71 that carry more zeros are inverted until the running disparity counter approaches zero. Once the word 71 is inverted, the DC balance bit is changed to a one signal, allowing the receiver to properly identify which words 71 are inverted.

This multiplexed audio stream are split into a plurality of copies. Each of these multiplexed audio streams is transmitted to a physical layer interface 407. The physical layer interface 407 module is configured to format the multiplexed audio stream for transmission. In an embodiment of the invention, each physical layer interface 407 is configured to transmit the multiplexed audio stream as a low-voltage differential signal (LVDS) over a single twisted pair, such as a twisted pair of cat-5 cable.

FIG. 10 is a cross section of a cat-5 cable, according to an embodiment of the invention. A first twisted pair 701 is configured for transmitting the multiplexed audio stream to an expansion receiver 101. A second twisted pair 702 is configured to transmit control information to the expansion receiver 101 and status information from the expansion receiver 101. For example, the control information may comprise zone grouping, source selection, volume level, tone control, equalization and other audio processing parameters.

Advantageously, as the multiplexed audio stream is DC balanced, an alternating current (AC) coupled transmission line may be employed. In other embodiments, a transformer coupled transmission line may be employed thereby facilitating use of the common mode for other purposes. Additionally, by transmitting all audio sources on one twisted pair, no accounting for skew in the cables is required, thereby lowering the cost and complexity of the expansion receivers 101. Finally, an auto-adjusting LVDS equalizer is employed at the expansion receiver 101. Therefore, no knowledge of cable length is required for physical transmission.

The third twisted pair 703 and fourth twisted pair 704 are not employed to transmit the multiplexed audio stream and control information. As such, the remaining two pairs may be used to communicate other information between the master transmitter 100 and the expansion receiver 101. For example, in further embodiments of the invention one or more of the free twisted pairs is configured for use as back channel, for additional audio channels or for further control purposes including transmitting control methods using Ethernet protocol.

For example, in a further embodiment of the invention, one or more free pairs may be used as a backchannel to transmit audio located near an expansion receiver 101 to the master transmitter 100 device. The master transmitter 100 device may then distribute this back channel audio to its local zones via speaker outputs 204 or multiplex it with other audio streams for distribution to expansion receivers 101. In embodiments of the invention with back channels, a balanced form of SPDIF may be transmitted on one of the free pairs or differentially between the common mode of two pairs.

In a further embodiment of the invention, the two free twisted pairs are configured for transmitting compressed audio or video to the expansion receivers 101 via Ethernet. Similarly, free pairs may be configured for use as a back channel to transmit compressed audio or video from the expansion receivers 101 to the master transmitter 100.

When utilizing Ethernet in the cable, an Ethernet switch may be incorporated in either the master transmitter 100 or each expansion receiver 101 to allow multiple ports to communicate or to connect to a port exposed to an external switch or router and eventually to the Internet.

Additionally, in further embodiments of the invention power may be transmitted over the free twisted pairs or on the common mode of the twisted pairs. For example, the expansion receiver 101 may receive power via Power over Ethernet (PoE).

In another embodiment of the invention, the physical layer interface 407 is configured for transmitting and receiving signals via fiber optic cable. Advantageously, the multiplexed audio stream is DC balanced, thereby facilitating fiber optic transmission.

Various fiber optic transmission configurations may be employed to transmit the audio data as well as control and status information. The fiber optic cable may comprise a separate fiber for the bidirectional communication path. Alternatively, wave division multiplexing (WDM) may be employed to transmit audio, control and status information on the same fiber. For example, two forward wavelengths and one reverse wavelength could carry the audio and bidirectional control. Additionally, other combinations of forward and reverse wavelengths could be used to carry additional forward or reverse audio channels or bidirectional Ethernet traffic.

To condition the control and status information for fiber optic transmission, transmit and receive signals may be separated on both sides of the fiber link. After separation, both the master transmitter 100 and the expansion receiver 101 may reformat the data to a format compatible with fiber optic transmission, such as by DC balancing the signal. Various forms of modulation could also be used for this including frequency-shift keying (FSK). Additionally, control information may be encoded in the spare bandwidth of the audio stream. This would allow for the use of a lower cost bi-directional fiber optic transceiver with a single wavelength in each direction.

FIG. 11 is a back panel 11 of the expansion receiver 101 and FIG. 12 is a front panel 12 of the expansion receiver 101, according to an embodiment of the invention. The back panel 11 comprises a digital communication input 110 and a plurality of speaker outputs 111. The digital communication input 110 may be an RJ45 connector with LEDs utilized to indicate link status and other statuses.

The speaker outputs 111 are configured for transmitting recovered audio from the multiplexed audio stream to one or more zones of speakers 104. To provide more power output, the speakers 104 may be bridged. For example, to overcome a noisy environment like an outdoor pool, a first speaker output and a second speaker output may be bridged to provide additional power.

The front panel 12 comprises a plurality of zone buttons 120 and status lights 121. A user may associate a zone with an audio source 103 by entering a setup mode on the master transmitter 100. Once in setup mode, the user may select the desired audio source 103 by depressing the source button on the master transmitter 100 and select one or more desired zones by then depressing the corresponding one or more zone buttons 120. The indicator lights 121 corresponding to each source and zone button will light to indicate that the correct zone and source has been selected.

FIG. 13 is a functional block diagram of the expansion receiver 101 according to an embodiment of the invention. The expansion receiver 101 depacks the multiplexed audio stream and transmits audio to one or more desired zones as provided in the control information. The expansion receiver 101 comprises a physical layer interface 130, a demultiplexer 131, a crosspoint 132, and a plurality of output paths each further comprising a digital signal processor (DSP) 133, a digital to analog convertor (DAC) 134 and an audio power amplifier 135.

The physical layer interface 130 is configured to receive the multiplexed audio stream from the master transmitter 100 and provide it to the demultiplexer. An auto-adjusting LVDS equalizer is employed in the physical layer interface 130 to account for variable cable lengths.

The demultiplexer 131 separates the multiplexed audio stream into its component audio streams. Additionally, the demultiplexer 131 is configured for detecting errors in the transmitted audio. For example, in embodiments of the invention in which inverted copies of data is transmitted from the master transmitter 100 to the expansion receiver 101 for DC balancing, the inverted copy may be compared with the actual data to detect errors in transmission. The demultiplexer 131 outputs signals as I2S streams with the bit clock and the channel clock recovered from the multiplexed audio stream.

The crosspoint 132 is configured for routing each desired I2S stream to its selected output path according to the control information provided from the master transmitter 100.

Each output path comprises a DSP 133, a DAC 134 and an audio power amplifier 135. After processing, conversion and amplification, each desired audio signal is transmitted to a zone of speakers 104. Advantageously, latencies in the inventive audio distribution system 10 are so short as to be considered inaudible. This is important in applications where the audio is associated with video or when multiple zones are playing the same content. For example, in an embodiment of the invention, the link delay is under 1 millisecond and the SRC delay in the DSP is 2 milliseconds.

To increase protection of connected speakers 104 from damage, "pops" and audio transients are eliminated through multiple levels of protection. In the first level of protection, each DSP 133 further comprises an SRC. Each SRC filters out discontinuities in an audio stream.

Additionally, link integrity is checked according to three indicators. If a faulty link or corrupted data is detected, the audio may be muted in response. First, the signal level and frequency of the multiplexed audio stream is checked at the LVDS equalizer. Next, a predetermined amount of data is required to be received before audio processing is begun. During clock recovery, once a deserializer locks onto the start and stop bit sequence of the twelve bit words 71, a timer is started which requires a predetermined amount of data to be received before audio is processed. Advantageously, this protects speakers 104 from damage in situations where a cable is being intermittently connected and disconnected or if there is a marginal link between the master transmitter 100 and the receiver. Finally, each word 71 is checked for proper DC balancing, framing, and data errors. Errors are reported and logged and upon a predetermined amount of errors, audio is muted.

FIG. 13 shows an audio distribution system with daisy chained expansion receivers 101, according to an illustrative embodiment of the invention. In this embodiment, the expansion receivers 101 are further configured for being daisy chained to each other.

The master transmitter 100 is coupled to a first expansion receiver 101 via an audio communication path and a control communication path. The master transmitter 100 is configured for transmitting a multiplexed audio stream to the first expansion receiver 101 via the audio communication path and transmit control information and receive status information via the control communication path. The first expansion receiver 101 is configured for receiving the multiplexed audio stream and outputting one or more desired audio signals to one or more desired zones of speakers 104. The master transmitter 100 is further configured for transmitting the multiplexed audio stream to a second expansion receiver 102 via an audio communication path and transmit control information and receive status information via a control communication path.

In a further embodiment of the invention, each expansion receiver 101 further comprises one or more audio inputs, either digital or analog. The expansion receiver 101 is configured for receiving one or more audio signals from local audio sources 140 and further configured for multiplexing these received audio signals on the multiplexed audio stream received from the master transmitter 100. For example, the expansion receiver 101 may de-encode the received multiplexed audio stream and reencode with the received local audio sources 140. In an embodiment of the invention, PCM streams are decoded into individual channels and then crosspointed with streams from other bus segments. Very large crosspoints may be implemented in this manner. In an embodiment of the invention, the channels have synchronous clocks. In other embodiments the channels pass through asynchronous sample rate converters to convert the clock domains to a master clock.

Box discovery and addressing could be implemented by changing tags in the daisy-chained stream or interrupting the daisy chain to create point-to-point links during discovery of who is upstream or downstream.

In a further embodiment of the invention, the master transmitter 100 further comprises one or more mixers. Various channels of audio may combined by mixing, prior to multiplexing and transmission. Advantageously, this is useful for live applications where the audio sources could be a combination of microphones, musical instruments and/or audio source devices.

In a further embodiment of the invention, the master transmitter 100 may further comprise a video switcher, such as an HDMI switcher. The audio could be extracted from the HDMI section utilizing HDMI receivers or repeaters.

FIG. 15 is a flowchart illustrating a method of distributing audio according to an illustrative embodiment of the invention. In step 1001, the master transmitter receives up to thirty two I2S streams. Each of the thirty two streams are sixty four bits and comprise two channels of audio at a precision of twenty four bits. In step 1002, the master transmitter successively inserts a right channel ID and a left channel ID across multiple sample frames of each I2S stream. In step 1003, each sample frame of the I2S stream is divided into ordered four bit portions. In step 1004, each of these four bit portions are encoded as a twelve bit word. The twelve bit word comprises a start bit, the four bit portion, an inverted copy of the four bit portion, two framing bits and a stop bit. In step 1005, the twelve bit words are multiplexed into a TDM audio stream such that each frame of the TDM audio stream comprises a sample of audio from each channel.

FIG. 16 is a flowchart illustrating a method of distributing audio according to an illustrative embodiment of the invention. In step 1101, the master transmitter receives up to sixty-four I2S streams. Each of the sixty-four streams are sixty four bits and comprise two channels of audio at a precision of twenty four bits. In step 1102, the master transmitter successively inserts a right channel ID and a left channel ID across multiple sample frames of each I2S stream. In step 1103, each sample frame of the I2S stream is divided into ordered eight bit portions. In step 1104, each of these eight bit portions are encoded as a twelve bit word. The twelve bit word comprises a start bit, the eight bit portion, a DC balance bit, a framing bit, and a stop bit. In step 1105, the twelve bit words are multiplexed into a TDM audio stream such that each frame of the TDM audio stream comprises a sample of audio from each channel.

FIG. 17 is a flowchart illustrating a method of processing a time-division multiplexed audio stream, according to an embodiment of the invention. In step 1201, the expansion receiver receives the TDM audio stream. In step 1202, the line voltage and frequency of the TDM audio stream are checked at the equalizer of the physical layer interface. If the values are not within a predetermined range, the audio is muted. If the values are within a predetermined range, in step 1203 a sufficient amount of good data is received before the stream is processed. In step 1204, the expansion receiver logs data errors detected by comparing the portion of the sample frame with an inverted portion of the sample frame. In step 1205, the expansion receiver logs DC balancing errors detected from the DC value of the TDM audio stream. If the data errors and DC balancing errors exceed a maximum value, the audio is muted.

List of Acronyms Used in the Detailed Description of the Invention

The following is a list of the acronyms used in the specification in alphabetical order.

AC alternating current
ADC analog to digital converter
CAT-5 category 5
CD compact disc
DAC digital to analog converter
dB decibels
DC direct current
DSP digital signal processor
EQ equalization
FPGA field programmable gate array
FSK frequency-shift keying
HDMI high-definition multimedia interface
kHz kilohertz
LCD liquid crystal display
LED light emitting diode
LVDS low voltage differential signaling
I2S Inter-IC sound
MHz megahertz
PCM pulse-code modulation
S/PDIF Sony Phillips Digital Interface Format
SRC sample rate converter
STP shielded twisted pair
TOSLINK Toshiba Link
UTP unshielded twisted pair
TDM time division multiplexed/ing
WDM wave division multiplexing Alternate Embodiments Alternate embodiments may be devised without departing from the spirit or scope of the invention. For example, the master transmitter may be configured for transmitting a multiplexed audio stream comprising channels of surround sound audio.

What is claimed is:

1. A system for distributing audio comprising:
(a) a master transmitter configured for
(i) multiplexing a plurality of Integrated Interchip Sound (I2S) streams as a time-division multiplexed audio stream, each frame of the I2S stream comprising sixty-four bits encoding two channels of audio at twenty-four bits precision and corresponding to a stereo source,
(ii) transmitting the time-division multiplexed audio stream on a first communication path wherein each frame of the time-division multiplexed audio stream comprises a plurality of words comprising a start bit, a four bit portion of a sample frame, an inverted copy of the four bit portion, two framing bits and a stop bit, and
(iii) transmitting control information on a second communication path; and
(b) an expansion receiver configured for
(i) receiving the time-division multiplexed audio stream and control information;
(ii) demultiplexing the time-division multiplexed audio stream; and (iii) distributing a desired audio channel to a speaker according to the control information.

2. A system for distributing audio comprising:
(a) a master transmitter configured for
(i) multiplexing a plurality of Integrated Interchip Sound (I2S) streams as a time-division multiplexed audio stream, each frame of the I2S stream comprising sixty-four bits encoding two channels of audio at twenty-four bits precision and corresponding to a stereo source wherein for each I2S stream a right channel address and a left channel address are successively inserted over a predefined number of sample frames in unused portions of the sample frames,
(ii) transmitting the time-division multiplexed audio stream on a first communication path, and
(iii) transmitting control information on a second communication path; and
(b) an expansion receiver configured for
(i) receiving the time-division multiplexed audio stream and control information;
(ii) demultiplexing the time-division multiplexed audio stream; and
(iii) distributing a desired audio channel to a speaker according to the control information.

3. The system of claim 2 wherein the right channel address and the left channel address are successively inserted in the unused portion of every sixteen sample frames, each address comprising a two byte master transmitter identification (ID) and a three byte channel ID.

4. The system of claim 1 wherein the master transmitter is configured for multiplexing thirty-two I2S streams corresponding to thirty-two stereo sources, each frame of the I2S stream comprising sixty-four bits encoding two channels of audio at twenty-four bit precision; and each frame of the time-division multiplexed signal comprises five hundred and twelve words, each of said words comprising a start bit, a four bit portion of a sample frame, an inverted copy of the four bit portion, two framing bits and a stop bit.

5. A system for distributing audio comprising:
(a) a master transmitter configured for
(i) multiplexing thirty-two Integrated Interchip Sound (I2S) streams as a time-division multiplexed audio stream, wherein each frame of the I2S stream comprises sixty-four bits encoding two channels of audio at twenty-four bit precision and for each I2S stream a right channel address and a left channel address are successively inserted over a predefined number of sample frames in unused portions of the sample frames,
(ii) transmitting the time-division multiplexed audio stream on a first communication path, and
(iii) transmitting control information on a second communication path; and
(b) an expansion receiver configured for
(i) receiving the time-division multiplexed audio stream and control information;
(ii) demultiplexing the time-division multiplexed audio stream; and
(iii) distributing a desired audio channel to a speaker according to the control information.

6. The system of claim 5 wherein the right channel address and the left channel address are successively inserted in the unused portion of every sixteen sample frames, each address comprising a two byte master transmitter identification (ID) and a three byte channel ID.

7. The system of claim 5 wherein:
(a) ten sample frames of every sixteen sample frames each comprise eight multiframe position bits, a twenty-four bit right channel audio sample, a twenty-four bit left channel audio sample, a four bit portion of the right channel ID, and a four bit portion of the left channel ID; and
(b) six sample frames of every sixteen sample frames each comprise eight multiframe position bits, a twenty-four bit right channel audio sample, a twenty-four bit left channel audio sample and eight unused bits.

8. The system of claim 5 wherein a port ID is successively inserted in the unused portion of a predetermined number of sample frames.

9. The system of claim 5 wherein audio metadata is inserted in the unused portion of a predetermined number of sample frames.

10. The system of claim 5 wherein audio source information is inserted in the unused portion of a predetermined number of sample frames.

11. The system of claim 1 wherein the master transmitter is configured for multiplexing sixty-four Integrated Interchip Sound (I2S) streams corresponding to sixty-four stereo sources, wherein each frame of the I2S stream comprises sixty-four bits encoding two channels of audio at twenty-four bit precision and each frame of the time-division multiplexed signal comprises five hundred and twelve words, each of said words comprising a start bit, an eight bit portion of a sample frame, a direct current balancing bit, a framing bit and a stop bit.

12. A system for distributing audio comprising:
(a) a master transmitter configured for
(i) multiplexing sixty-four Integrated Interchip Sound (I2S) streams as a time-division multiplexed audio stream, wherein each frame of the I2S stream comprises sixty-four bits encoding two channels of audio at twenty-four bit precision and for each I2S stream, a right channel address and a left channel address are successively inserted over a predefined number of sample frames in unused portion of the sample frames,
(ii) transmitting the time-division multiplexed audio stream on a first communication path, and
(iii) transmitting control information on a second communication path; and
(b) an expansion receiver configured for
(i) receiving the time-division multiplexed audio stream and control information;
(ii) demultiplexing the time-division multiplexed audio stream; and
(iii) distributing a desired audio channel to a speaker according to the control information.

13. A system for distributing audio comprising:
(a) a master transmitter configured for
(i) multiplexing a plurality of audio channels as a time-division multiplexed audio stream,
(ii) transmitting the time-division multiplexed audio stream on a first communication path, and
(iii) transmitting control information on a second communication path wherein control information comprises one of the following: a zone grouping control, a source selection control, a volume level control, a tone control and an equalization control; and
(b) an expansion receiver configured for
(i) receiving the time-division multiplexed audio stream and control information;
(ii) demultiplexing the time-division multiplexed audio stream; and (iii) distributing a desired audio channel to a speaker according to the control information.

14. The system of claim 13 wherein the first communication path and the second communication path are transmitted on a single cable.

15. The system of claim 14 wherein the first communication path is a first twisted pair and the second communication path is a second twisted pair.

16. The system of claim 15 wherein the single cable is a category-5(cat-5) cable and a third twisted pair is configured for serving as a back channel communication path from the expansion receiver to the master transmitter.

17. The system of claim 15 wherein the single cable is a cat-5 cable and the master transmitter and expansion receiver are configured for communicating over Ethernet on a third pair and a fourth pair of the cat-5 cable.

18. The system of claim 14 wherein the single cable is a fiber optic cable.

* * * * *